(12) United States Patent
Bohn

(10) Patent No.: US 7,091,951 B2
(45) Date of Patent: *Aug. 15, 2006

(54) HIGH RESOLUTION SCROLLING APPARATUS

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 319 days.

This patent is subject to a terminal disclaimer.

(21) Appl. No.: 10/359,523

(22) Filed: Feb. 5, 2003

(65) Prior Publication Data

US 2004/0150621 A1   Aug. 5, 2004

(51) Int. Cl.
 *G09G 5/08* (2006.01)
(52) U.S. Cl. ........................... 345/163; 345/166
(58) Field of Classification Search ........ 345/156–167, 345/170; 250/221, 224, 231; D14/402–409
See application file for complete search history.

(56) References Cited

U.S. PATENT DOCUMENTS

| | | | |
|---|---|---|---|
| 5,168,268 A | * | 12/1992 | Levy ........................ 345/165 |
| 5,530,455 A | * | 6/1996 | Gillick et al. ............... 345/163 |
| 5,912,661 A | | 6/1999 | Siddiqui |
| 6,075,518 A | | 6/2000 | Pruchniak |
| 6,097,371 A | | 8/2000 | Siddiqui et al. |
| 6,128,006 A | * | 10/2000 | Rosenberg et al. ......... 345/163 |
| 6,281,881 B1 | | 8/2001 | Siddiqui et al. |
| 6,353,429 B1 | | 3/2002 | Long |
| 6,380,927 B1 | | 4/2002 | Ostrum et al. |
| 6,476,375 B1 | * | 11/2002 | Nicoud et al. ............... 250/221 |

* cited by examiner

*Primary Examiner*—Richard Hjerpe
*Assistant Examiner*—Mansour M. Said
(74) *Attorney, Agent, or Firm*—Banner & Witcoff, Ltd.

(57) ABSTRACT

A scrolling apparatus is disclosed that includes a rotatable scroll wheel and a sensor assembly coupled mechanically. The sensor assembly has an encoder wheel that rotates in response to rotation of the scroll wheel. The rotational axis of the encoder wheel is axially displaced from the rotational axis of scroll wheel, and concepts related to gearing may be utilized to increase the angular velocity of the encoder wheel in relation to the scroll wheel. In addition, the diameter of the encoder wheel may be greater than the diameter of a conventional encoder wheel. The gearing concepts and the differences in diameter of the scroll wheel and encoder wheel may be utilized alone or in combination to provide the scrolling apparatus with relatively high resolution.

27 Claims, 4 Drawing Sheets

HIGH RESOLUTION SCROLLING APPARATUS

BACKGROUND OF THE INVENTION

1. Field of the Invention

The present invention relates to a scrolling apparatus for repositioning an image relative to a display screen. More particularly, the present invention relates to a high resolution scrolling apparatus that may be incorporated into an input device, such as a mouse, trackball, or keyboard, to scroll an image relative to a display screen.

2. Description of Background Art

The viewable contents of a computer file, such as a text document, spreadsheet, digital photograph, Web page, or other image rendered on a conventional display screen, may possess a size exceeding the viewable boundaries of the display screen. To address this issue, an individual may utilize a scrolling apparatus to reposition the image relative to the display screen, thereby permitting the individual to view portions of the computer file not currently rendered. As utilized herein, scrolling describes a translatory movement of the image relative to the display screen and in a particular direction. For example, scrolling down generally describes a movement of the image relative to the display screen so as to produce an effect of moving downward in the image. Similarly, scrolling up, scrolling left, and scrolling right generally describe movement of the image relative to the display screen so as to produce an effect of moving the image upward, left, and right, respectively.

Scrolling apparatuses have been incorporated into a plurality of peripheral input devices, including computer mice and trackball pointing devices, for example. An example of a computer mouse incorporating a scrolling apparatus is disclosed in U.S. Pat. No. 5,912,661 to Siddiqui, which is hereby incorporated by reference. Elements of the scrolling apparatus include a finger-engageable scroll wheel and a sensor assembly. The scroll wheel is mounted within a housing of the computer mouse, and a portion of the scroll wheel protrudes from an opening in the housing to permit an individual to selectively rotate the scroll wheel. The sensor assembly detects rotation of the scroll wheel and transmits a corresponding signal to a host computer, thereby directing the image to scroll relative to the display screen. By rotating the scroll wheel in a first direction, an image on a display screen may be scrolled upward, for example. Similarly, by rotating the scroll wheel in an opposite second direction, the image may be scrolled downward. Accordingly, a scroll wheel may be operated in a bi-directional manner to vertically scroll the image relative to the display screen.

The sensor assembly in U.S. Pat. No. 5,912,661 includes an encoder wheel, a light source, and a light sensor. The encoder wheel and the scroll wheel are spaced from each other and mounted in an axially-aligned manner on a shared rotatable axle that is positioned within the housing. In addition, the encoder wheel is positioned between the light source and the light sensor. A plurality of angularly-spaced openings extend around a periphery of the encoder wheel to form a circular sensing region. As the encoder wheel rotates, light from the light source is alternately (1) transmitted through the openings and (2) blocked by the material of the encoder wheel. As the encoder wheel rotates, the pulses of light transmitted through the openings are detected by the light sensor. In response to the pulses of light, the light sensor transmits a signal to a host computer that indicates rotation of the scroll wheel, thereby inducing scrolling of the image relative to the display screen. Furthermore, the frequency of the sensed pulses corresponds to the rate at which the scroll wheel is being rotated. Accordingly, the rate at which the scroll wheel rotates is generally correlated to the speed at which the image scrolls.

In another existing scrolling apparatus, the scroll wheel includes, in the form of a hub, a plurality of internal angular slit openings that form an encoder disk/wheel. The light source and the light sensor are positioned on opposite sides of the encoder wheel. When the scroll wheel is rotated, light pulses are alternatively (1) transmitted through the openings and are detected by the light sensor, and (2) blocked by material between the slits. Scrolling is then performed similar to the manner described above.

In each scrolling apparatus discussed above, the scroll wheel and the encoder wheel rotate at the same rate. That is, a single rotation of the scroll wheel causes a single rotation of the encoder wheel. The sensing capabilities of these embodiments therefore depend upon the number of openings or slits in the encoder wheel at its sensing radius location. For example, if there are 20 openings disposed on the encoder wheel (1 opening for every 18°), a single rotation of the scroll wheel will cause the encoder wheel to rotate a full 360° and there will be 20 pulses. To increase the resolution capabilities of the described systems, the encoder wheels would need to be provided with more openings or slits that are spaced closer together so that more pulses are provided per revolution. However, there is a practical limit in increasing the number of openings in an encoder wheel with a limited sensing diameter due to manufacturing capabilities, tolerances, and costs. Accordingly, a scroll wheel sensing arrangement with increasing resolution capabilities was thus needed.

SUMMARY OF THE INVENTION

In one aspect of the present invention, a scrolling apparatus having the capability of providing a relatively high resolution is incorporated into a housing of an input device. The scrolling apparatus includes a scroll wheel that is mechanically coupled to a sensor assembly, which may further include an encoder wheel, a light source, and a light sensor. The encoder wheel includes a plurality of openings and is rotatably-mounted between the light source and the light sensor such that a rotational axis of the encoder wheel is offset from a rotational axis of the scroll wheel. The mechanical coupling between the scroll wheel and the sensor assembly operates to rotate the encoder wheel when an individual utilizing the input device rotates the scroll wheel. When the encoder wheel rotates, light from the light source passes through the openings to form pulses of light that enter the light sensor. A signal is then transmitted by the light sensor, or a microprocessor coupled to the light sensor, to a host computer that directs scrolling of an image relative to a display screen.

In another aspect, the scrolling apparatus has a high degree of design flexibility to provide a desired resolution due in part to a configuration wherein the rotational axis of the encoder wheel is displaced from the rotational axis of the scroll wheel. In one embodiment, the scroll wheel is oriented vertically, perpendicular to a supporting surface, and positioned toward a front area of a mouse-style pointing device. The encoder wheel is also oriented vertically and perpendicular to the supporting surface, but is positioned towards a rear area of the pointing device. In this arrangement, the rotational axes of the scroll wheel and the encoder wheel may be substantially parallel. In another embodiment, the encoder wheel is oriented horizontally such that the rotational axes of the scroll wheel and the encoder wheel are substantially perpendicular.

According to another aspect, the structure of the scrolling apparatus provides a configuration that permits the encoder wheel to be in a different area of the input device than the scroll wheel. The encoder wheel of the present invention may be located in a rear area of the input device, which generally has more available space. Accordingly, a diameter of the encoder wheel, and if desired the sensing region of the encoder wheel, may be greater than a diameter of the scroll wheel. The increased diameter permits a greater number of openings to be formed in the encoder wheel, thereby increasing resolution of detectable movement in the scroll wheel.

In another aspect of the present invention, the scrolling apparatus provides a configuration that permits the encoder wheel to rotate at a higher rate of angular displacement than the scroll wheel. In such an arrangement, a system having a belt and pulleys of different diameters, for example, may be employed to increase the amount of rotation of the encoder wheel relative to the scroll wheel. The increased angular velocity permits a greater number of openings to pass by the light source and light sensor per a single rotation of the scroll wheel, which in turn increases the resolution of detectable movement in the scroll wheel.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose high resolution scrolling apparatuses for moving or scrolling an image relative to a display screen. Viewable portions of computer files, which include text documents, spreadsheets, digital photographs, computer-generated drawings, or Web pages, for example, may be rendered as an image on a display screen. The manner in which the image is configured to be rendered on the display screen determines whether all portions of the image are simultaneously rendered within viewable boundaries of the display screen. Accordingly, the image may be configured to possess dimensions fitting entirely within the viewable boundaries of the display screen. The same image, however, may also be configured to possess dimensions exceeding the viewable boundaries of the display screen. In other words, the image may include a rendered portion that is currently viewable on the display screen and a hidden portion that is not simultaneously viewable on the display screen. The scrolling apparatuses of the present invention are utilized to scroll the image relative to the display screen, thereby revealing the hidden portions of the image.

Figure 1:
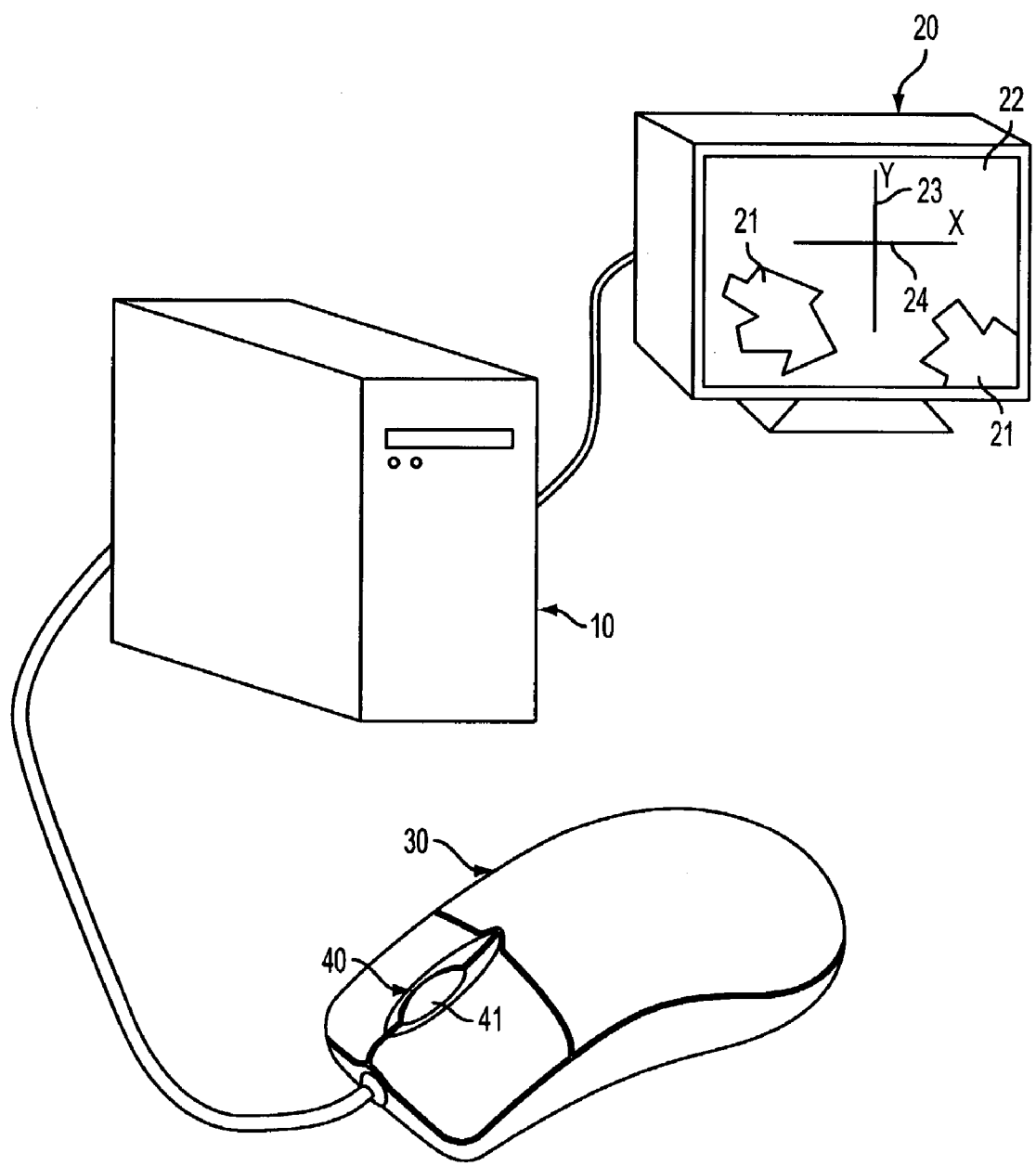
FIG. 1 is a perspective view of an input device incorporating a scrolling apparatus in accordance with the present invention, the input device being operatively connected to a host computer and a display device.

FIG. 1 depicts a host computer 10 operatively connected to a display device 20, such as a computer monitor, and an input device 30, which may be a computer mouse. One skilled in the relevant art will recognize that a computer file may be processed by the host computer 10 and a signal may be transmitted to the display device 20, thereby directing the display device 20 to render an image 21 on a display screen 22. The image 21 includes, in accordance with the discussion above, a rendered portion and a hidden portion. An individual viewing the image 21 will not, therefore, view all portions of the image 21 simultaneously. To address this issue, the input device 30 incorporates a scrolling apparatus 40 that may be utilized by the individual to scroll the image 21 relative to the display screen 22. For example, the image 21 may be scrolled in a vertical direction, which corresponds with a y-axis 23. In further embodiments, or if operated under different conditions, the image 21 may also be scrolled in a horizontal direction, which corresponds with an x-axis 24, or the image 21 may be scrolled diagonally. Both the y-axis 23 and the x-axis 24 are depicted for reference on the display screen 22. The individual may, therefore, utilize the scrolling apparatus 40 to scroll the image 21 relative to the display screen 22, thereby permitting the individual to view currently hidden portions of the image 21.

The scrolling apparatus 40 is depicted in the figures as being incorporated into the input device 30, which is a pointing device, particularly a computer mouse. In addition to the mouse-style pointing device, the scrolling apparatus 40 may also be incorporated into other types of input devices, including a trackball pointing device, a touchpad pointing device, and a keyboard, for example. Within the scope of the present invention, however, the scrolling apparatus 40 may also be incorporated into a plurality of other computer-related related input devices, such as the bezel of a personal data assistant or handheld computing device, a web pad or other internet appliance, a gaming controller, or a chassis of a notebook computer, for example. The manner in which the scrolling apparatus 40 may be incorporated into a computer system is not limited, therefore, to the precise example embodied by the input device 30 in the drawings, but may be incorporated into a variety of components to provide the high resolution scrolling functions discussed herein.

Figure 2:
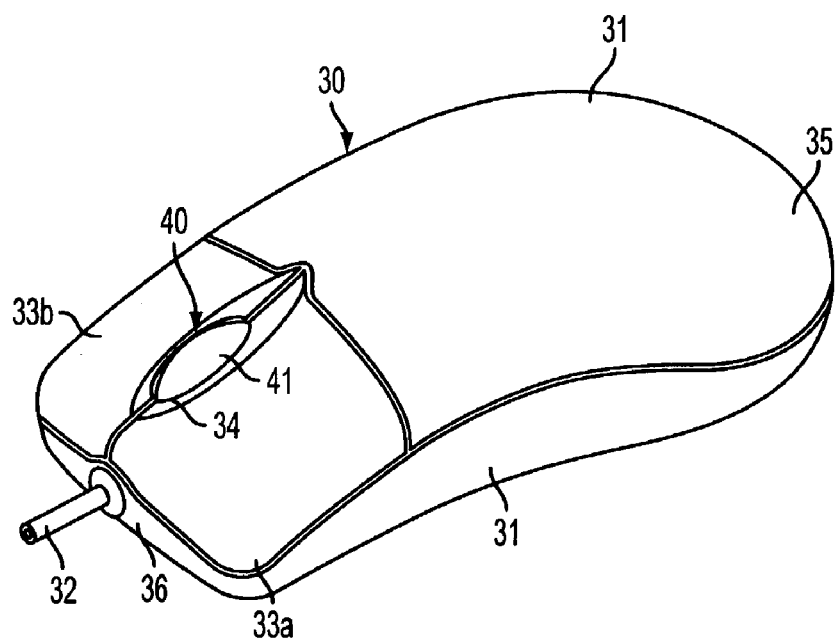
FIG. 2 is a perspective view of the input device incorporating the scrolling apparatus.

The input device 30 is depicted individually in FIG. 2 and serves multiple functions, including the functions of the scrolling apparatus 40. As represented, the input device 30 is a mouse-style pointing device having an outer housing 31 generally shaped to interface with the shape of a hand. A tracking assembly (not depicted) is partially enclosed within the housing 31 for detecting movement of the input device 30 relative to a support surface, as is known in the art. The tracking assembly includes a rollball that engages perpendicular rollers. The rollball protrudes outward from the housing 31 and rotates in multiple directions. A first roller senses movement of the mouse (via the movement of the rollball) in a first direction, while a second roller senses movement of the mouse (via the movement of the rollball) in a second direction. An optical tracking system may alternatively be employed, as is known in the art. Upon rotation of the rollball, a signal is transmitted to the host computer 10 through a cord 32, thereby directing the host computer 10 to move a cursor on the display screen 20. Alternately, the signal may be transmitted to the host computer 10 through a wireless connection, as is known in the art. The input device 30 also includes on its housing 31 a primary key 33a and a secondary key 33b for manipulating objects, such as hypertext links, buttons, or icons, on the display screen 22, as is known in the art. In general, the cursor may be positioned over an object through use of the tracking assembly, and one of keys 33a and 33b may be depressed, thereby manipulating the object by transmitting a corresponding signal to the host computer 10.

The housing 31 includes an aperture 34 therein for providing access to the scrolling apparatus 40. The aperture 34 is preferably positioned between keys 33a and 33b. The scrolling apparatus 40 includes a scroll wheel 41 that protrudes upwardly through the aperture 34 and has a generally circular or wheel-shaped structure for engagement by the user. The exterior surface of the scroll wheel 41 may be smooth or grooved. An axle 42 extends through a central portion of the scroll wheel 41 to define an axis of rotation for the scroll wheel 41. End portions of the axle 42 are rotatably-mounted on a pair of supports 43a and 43b, thereby permitting the scroll wheel 41 to revolve about the axle 42 in either a forward or backward direction. As utilized herein, the term scroll wheel denotes an endlessly rotatable (i.e., not limited to a number of rotations) structure configured to enable scrolling of an image on a display screen.

When operating the input device 30, the hand of the individual will generally rest upon an upper surface of the housing 31 such that the fingers extend over keys 33a and 33b and over the scrolling apparatus 40. The fingers may then be utilized to operate keys 33a and 33b and the scrolling apparatus 40. Within the scope of the present invention, however, the aperture 34, or any other aperture for providing access to the scrolling apparatus 40, may be located in other portions of the housing 31. As discussed above, the scrolling apparatus 40 may also be incorporated into other input devices. With regard to the keyboard, handheld computing device, or notebook computer, for example, an aperture for the scrolling apparatus 40 may be located at any position that provides the individual with convenient access for operating the scrolling apparatus 40.

The configuration and operation of the sensor assembly 50 will now be discussed. In general, the sensor assembly 50 includes an optical-based arrangement that detects rotational movement of the scroll wheel 41 and transmits a corresponding signal to the host computer 10, thereby causing the image 21 to scroll relative to the display screen 22. More specifically, a rotation of the scroll wheel 41 induces a corresponding proportional rotation in an encoder wheel 51 positioned in a rear area 35 of the housing 31. The encoder wheel 51 includes a plurality of blades 52 and openings 53 extending radially outward from a central area of the encoder wheel 51. Openings 53 are generally located between blades 52 and in peripheral portions of the encoder wheel 51. A light source 54 and a light sensor 55, which may be a light emitting diode and a phototransistor, respectively, are positioned on opposite sides of the encoder wheel 51. As utilized herein, the term "encoder wheel" denotes a rotatable wheel or disk that assists with the detection of rotation, and may include a plurality of openings (or reflective surfaces) that permit the transmission of (or reflect) light or another detectable waveform.

As the encoder wheel 51 rotates, light from the light source 54 is alternately (1) transmitted through openings 53 and (2) blocked by the material of blades 52. Pulses of light are transmitted through openings 53 as the encoder wheel 51 rotates enter the light sensor 55. In response to the pulses of light, the light sensor 55, or a microprocessor operatively connected to the light sensor 55, transmits a signal to the host computer 10 that indicates data relating to the angular rotation of the scroll wheel 41, thereby inducing the image 21 to scroll relative to the display screen 22. Furthermore, the frequency of the pulses is associated with the rate at which the scroll wheel 41 is being rotated. This can be used to control the speed at which the image 21 scrolls.

The encoder wheel 51 is positioned in the rear area 35 of the housing 31 and mounted on a rotatable axle 56 that is separate from the axle 42. The axis of rotation 56a of encoder wheel 51 lies within the axle 56, and is in an embodiment of the invention, substantially parallel to the axis of rotation 42a of the scroll wheel 42. The axle 56 extends from the central area of the encoder wheel 51 and provides support for the encoder wheel 51. A pulley 57 is mounted on the axle 56, and a belt 58 extends around the pulley 57. The belt 58 also extends around a corresponding pulley 47 mounted on the axle 42 and may be formed of urethane or a rubber material, for example. This configuration mechanically couples the scroll wheel 41 and the encoder wheel 51. Accordingly, the encoder wheel 51 rotates in response to a rotation of the scroll wheel 41.

The distance between the pulley 47 and the pulley 57 is selected such that the belt 58 is under tension and the surface of the belt 58 securely contacts each of the pulley 47 and the pulley 57, thereby providing a frictional engagement between the belt 58 and each of the pulley 47 and the pulley 57. As the pulley 47 rotates with the axle 42 and the scroll wheel 41, the frictional engagement induces a greater degree of tension in one of the two portions of the belt 58 that extend between the pulley 47 and the pulley 57. To relieve the tension, the belt 58 revolves and also causes the pulley 57 to rotate, thereby inducing rotation of the axle 56 and the encoder wheel 51. Accordingly, the belt 58 mechanically couples the scroll wheel 41 and the encoder wheel 51 such that a rotation of the scroll wheel 41 also causes the encoder wheel 51 to rotate.

The specific configuration of the mechanical coupling between the scroll wheel 41 and the encoder wheel 51, which includes the axle 42, the pulley 47, the axle 56, the pulley 57, and the belt 58, may vary significantly within the scope of the present invention. For example, the pulley 47 may be a separate element from the axle 42 and mounted on the axle 42. Alternately, the axle 42 and the pulley 47 may be molded as one element from a polymeric material, such as nylon. The pulley 47 may also have the configuration of an indentation in the axle 42 that receives the belt 58. Similar considerations apply to the axle 56 and the pulley 57. Furthermore, the use of pulleys 47 and 57 and the belt 58 to mechanically couple the scroll wheel 41 and the encoder wheel 51 is an example of one suitable mechanical coupling, with a system of gears also being suitable.

The encoder wheel 51 is mounted on the axle 56, which is separate from the axle 42, and the belt 58 provides the mechanical coupling. Thus, this configuration of the scrolling apparatus 40 offsets the rotational axis of the encoder wheel 51 from the rotational axis of the scroll wheel 41. Accordingly, the rotational axis of the encoder wheel 51 is axially displaced from the rotational axis of the scroll wheel 41. This configuration also provides two additional advantageous notable features.

First, concepts related to gearing may be utilized to increase the angular velocity of the encoder wheel 51 in relation to the scroll wheel 41. The relative diameter of pulleys 47 and 57 has an effect upon the rate at which the encoder wheel 51 rotates. In the scrolling apparatus 40, however, the pulley 47 associated with the scroll wheel 41 has a greater diameter than the pulley 57 associated with the encoder wheel 51. Therefore, in combination with the belt 58, this configuration of pulleys 47 and 57 effectively increases the angular displacement of the encoder wheel 51 relative to the angular displacement of the scroll wheel 41. For example, if the pulley 47 has a diameter that is two times the diameter of the pulley 57, then encoder wheel 51 will exhibit two rotations for every one rotation of the scroll wheel 41. Stated in yet another manner, the ratio of angular displacement between the encoder wheel 51 and the scroll wheel 41 is greater than 1:1. Assuming the use of the same size and configuration encoders, such an arrangement will increase the number of pulses and the resolution level by a factor of two. In lieu of a belt and pulley system, a gear arrangement may be utilized to mechanically couple the axles 42 and 56 together and increase the angular displacement of the encoder wheel 51 in relation to the scroll wheel 41.

In addition to or alternatively to the "gearing-up" arrangement to increase the displacement of the encoder wheel 51, the diameter of the encoder wheel 51 and the diameter of the encoder wheel at its scrolling location, may be greater than the diameter used by the conventional encoder wheels in scrolling arrangements, and may be more that the diameter of the scrolling wheel 42. Thus, for example, if a practical limit of providing encoding gaps and blockages is 20° at a radius of R (i.e., $\frac{1}{18}^{th}$ the circumference of the circle at the sensing point), increasing the radius to 2R with the same practical limits would effectively double the number blockages and openings and increase the number of pulses, and the resolution, for the same number of revolutions by a factor of two.

Since the encoder wheel 51 no longer needs to be on the same axis 42 as the scroll wheel 41, the encoder wheel 51 can be moved to a different location inside the mouse 30, such a location that would permit its size to be increased. For example, the general configuration of the housing 31, as depicted in FIG. 2, is representative of a housing-type utilized in a conventional computer mouse. Specifically, the central portion of the rear area 35 of the housing 31 bulges upward to support the hand of a user, and the housing 31 slopes downward toward the front area 36 to assist in providing an ergonomic shape. Whereas the distance between upper and lower portions of the housing 31 is relatively large in the central portion of the rear area 35, the distance is substantially smaller in the front area 36. The downward slope has an effect, therefore, upon the available volume within the front area 36 of the housing 31 for storing electrical components and other elements of the computer mouse. Despite the decreased volume, a substantial portion of the electrical components and other elements, such as the scroll wheel 41, the axle 42, supports 43a and 43b, are located in the front area 36. In addition, the encoder wheel is also located in the front area of the conventional computer mouse. Through a mechanical coupling to move the encoder wheel 51 off axis, such as the coupling formed by the belt 58 and pulleys 47 and 57, a larger, more economical sensor device may be positioned in rear area 35, behind the scrolling wheel 41, where the distance between upper and lower portions of the housing 31 is relatively large in comparison with the front area 36. Accordingly, the diameter of the encoder wheel 51 may be greater than the diameter of the conventional encoder wheel. An additional benefit of this an arrangement may be the reduction of the probability of an electrostatic discharge as the electrical optics elements are moved farther away from the aperture through which the scroll wheel protrudes.

If this increased diameter of the encoder wheel 51 feature is combined with the gearing- up feature described above, such as in the arrangement depicted in the figure, the overall increase in resolution would be the product of both increases in resolution. For example, if each of the features provides an increased resolution of two times, the resultant increase would be a resolution increase of four times. In other words, the number of pulses detected by a single rotation of the scroll wheel 41 would be four times the number of pulses detected by a single rotation of the scroll wheel using the same practical limits on encoder size and material and slit spacing. As a consequence of increasing the number of pulses, and therefore increasing the resolution, smaller angular displacements of the scroll wheel 41 can be detected. However, it is noted that either one of these features may be used without the other and it is not necessary that they both be used together.

Figure 3:
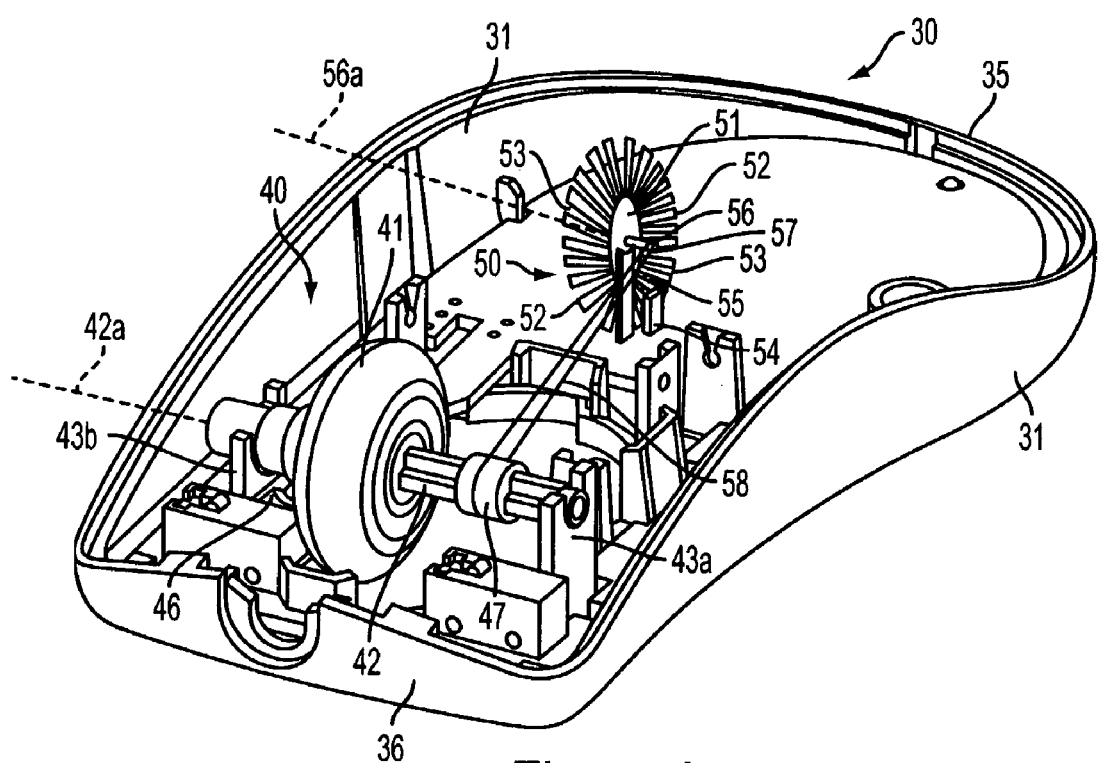
FIG. 3 is a cut-away perspective view of the input device depicting the scrolling apparatus.
Figure 4:
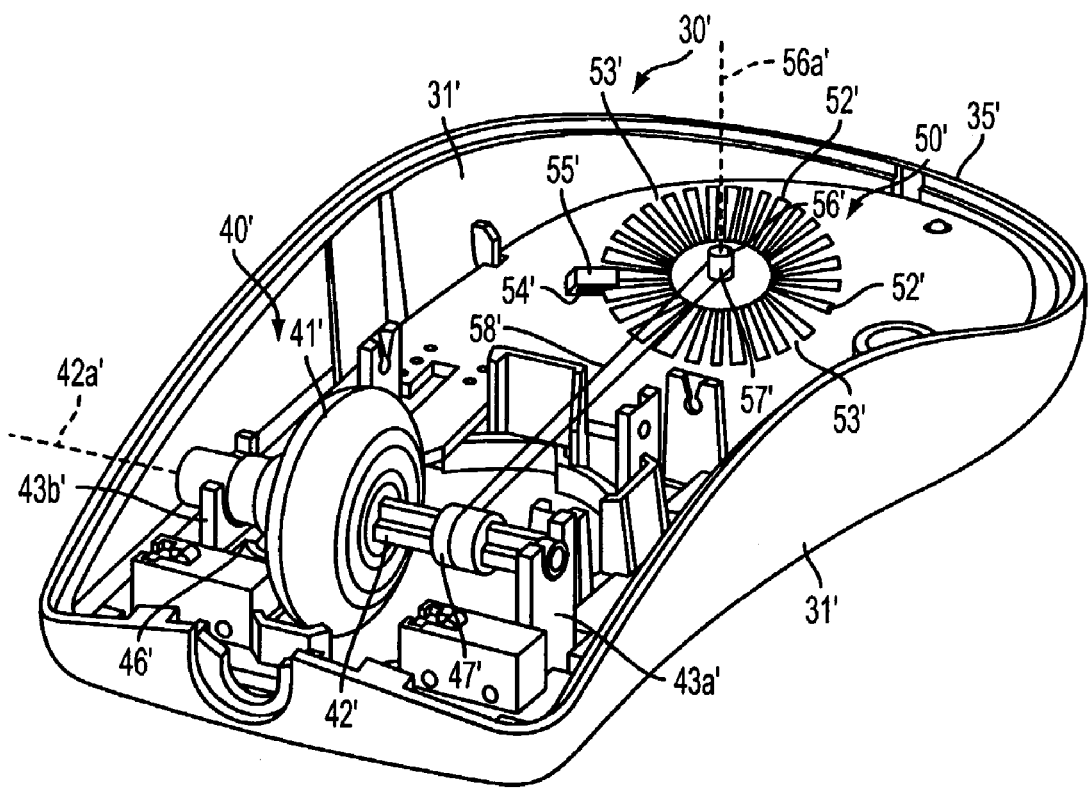
FIG. 4 is a cut-away perspective view of the input device depicting another configuration of a scrolling apparatus.

Another example of the manner in which the scrolling apparatus 40 may be altered within the scope of the present invention is depicted in FIG. 4 with reference to an input device 30', which has the general structure of the input device 30. Accordingly, the input device 30' has a housing 31' that encloses a scrolling assembly 40'. The components of the scrolling assembly 40' include a scroll wheel 41', an axle 42', supports 43a' and 43b', a pulley 47', and a sensor assembly 50'. In operation, as with the embodiment of FIG. 3, the scroll wheel 41' protrudes through the housing 31' and rotates on the axle 42', which is supported by supports 43a' and 43b'. The sensor assembly 40' is also mechanically coupled to the scroll wheel 41' through the pulley 47'. Accordingly, the scrolling apparatus 40' has a configuration that is similar to the scrolling apparatus 40.

One distinction between the scrolling apparatus 40' and the scrolling apparatus 40 relates to the structure of the sensor assembly 50', which includes an encoder wheel 51' with a plurality of blades 52' that define a plurality of openings 53'. Whereas the encoder wheel 51 is positioned substantially vertically, and substantially perpendicular to a supporting surface upon which the device 30 would sit in normal use, the encoder wheel 51' is positioned substantially horizontally and substantially parallel to a supporting surface upon which the device 30' would sit in normal use. Thus, based on the design of the housing of the mouse 30', a rear area 35' of the housing 31' behind the scroll wheel 41' has an internal width such that the encoder wheel 51' may be larger than both the encoder wheel 51 and the encoder wheel of the conventional scrolling apparatus.

In addition to the encoder wheel 51', the sensor assembly 50' includes a light source 54' and a light sensor 55' positioned on opposite sides of blades 52', a rotatable axle 56' extending vertically out of a central area of the encoder wheel 51', a pulley 57' mounted on the axle 56', and a belt 58' that extends between the pulley 47' and the pulley 57'. In operation, the light source 54' and the light sensor 55' detect movement of the encoder wheel 51', and the axle 56' provides an axis of rotation. In a manner that is similar to the sensor assembly 50, the belt 58' and pulleys 47' and 57' provide a mechanical coupling for the scroll wheel 41' and the encoder wheel 51'. The belt 58', alone and in contrast with the sensor assembly 50, is twisted 90° to accommodate the horizontal configuration of the axle 42' and the vertical configuration of the axle 56'. Accordingly, the belt 58' is twisted to extend around the offset rotational axes of the scroll wheel 41' and the encoder wheel 51'. The twist in the belt 58', however, does not affect the operation of the sensor assembly 50.

This configuration of the scrolling apparatus 40' offsets the rotational axis 56a' of the encoder wheel 51' from the rotational axis 42a' of the scroll wheel 41'. Whereas the rotational axes of the encoder wheel 51 and the scroll wheel 41 were also offset and parallel, the rotational axes of the encoder wheel 51' and the scroll wheel 41' are offset and oriented perpendicular to each other. The scrolling apparatus 40' also provides the same notable features as the scrolling apparatus 40. Specifically, concepts related to gearing may be utilized, as shown, to increase the angular displacement of the encoder wheel 51' in relation to the scroll wheel 41'. Thus, the ratio of angular displacement between the encoder wheel 51' and the scroll wheel 41' is greater than 1:1. Also, as shown, the diameter of the encoder wheel 51' and the diameter of the sensing region of the encoder wheel 51' is greater than the diameter of the conventional encoder wheel and that of the scroll wheel 41', and such may be achieved due to the horizontal orientation. These features may be utilized alone or in combination to increase the resolution of detectable movement in the scroll wheel 41'.

Figure 5:
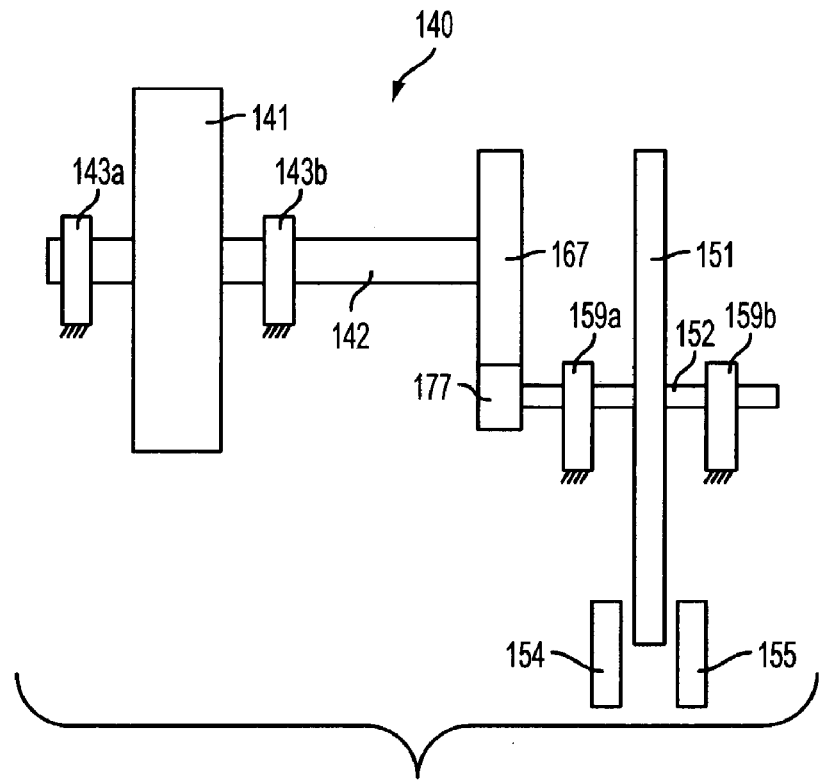
FIG. 5 is a schematic top plan view of the input device depicting another configuration of a scrolling apparatus.

FIG. 5 shows a schematic top plan view of a scrolling assembly 140. This arrangement is similar to those previously described except that the rotational force transfer system between the scroll wheel 141 and the encoder wheel 151 is a pair of interfacing rollers 167 and 177. In this configuration, the scroll wheel axle 142 is supported for rotation by a pair of supports 143a and 143b similar to those as previously described and illustrated. The encoder wheel axle 152 is off-axis from the scroll wheel axis and is supported for rotation by a pair of supports 159a and 159b to enable an aligned rotation of the encoder wheel 151 between a light source 154 and a light sensor 155.

The scroll wheel axle 142 has toothless gear, e.g., roller 167 and the encoder wheel axle 152 has toothless gear, e.g., roller 177. The rollers 167 and 177 preferably have high friction and slightly compressible outer coating and are mounted such that the rotation of scroll wheel axle 142 causes a rotation in the encoder wheel axle 152. If desired, a biasing arrangement, not shown, may be used for one or both of the axles 142 and 152 to ensure a desired level of contact between the rollers 167 and 177.

The roller 167 on the scroll wheel axle 142 preferably has a larger diameter that the roller 177 on the scroll wheel axle 152. This translates the rotational force in a manner such that the ratio of angular displacement of the encoder wheel 151 to the scroll wheel 141 is greater than 1:1. Further, in view of the flexibility in design the diameter of the encoder wheel 152 and the sensing region of the encoder wheel 151 may be larger than the diameter of the scroll wheel 141 and that of conventionally used encoder wheels in computer input devices such as mice and trackballs.

Therefore, in use, rotation by the user of the portion of the scroll wheel 141 that extends through an opening the housing causes rotation of the encoder wheel 151 by a rate that exceeds that of the scroll wheel 141. Additionally, because of the increased diameter of the encoder wheel 151, more openings and light blocking material can be provided within the same practical cost and manufacturing limitations to provide more pulses per rotation of the encoder wheel 151. The benefits of such features, alone and in combination, have been previously described.

Figure 6:
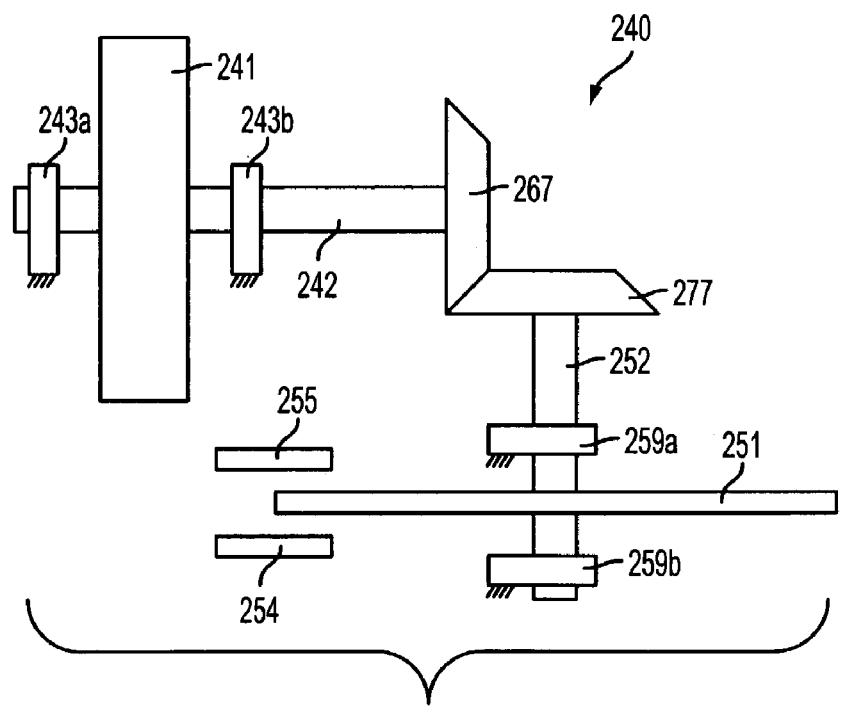
FIG. 6 is a schematic elevational view of the input device depicting another configuration of a scrolling apparatus.

FIG. 6 shows a schematic elevational view of a scrolling apparatus 240. This arrangement is similar to that of FIG. 5 except that rotational axis of the encoder wheel 251 is perpendicular with, and not parallel to, the rotational axis of the scroll wheel 241. To accomplish this, in an exemplary arrangement, the interfacing rollers 267 and 277 of the rotational force transfer system between the scroll wheel 241 and the encoder wheel 251 are angled to accommodate the different rotational axes. Alternatively, a third roller, not shown, may have an abutting periphery with engaging portions 90° displaced and such may interface with rollers on the encoder and scroll axles on their diametrical perimeter. In this configuration, the scroll wheel axle 242 is supported for rotation by a pair of supports 243a and 243b similar to those as previously described and illustrated. The encoder wheel axle 252 is off-axis from the scroll wheel axis and is supported for rotation by a pair of supports 259a and 259b to enable an aligned rotation of the encoder wheel 251 which is perpendicular to the scroll wheel 241. If desired, the supports 259a and 259b may be integral with the bottom and top of the housing of the computer input device. In addition, encoder wheel 251 is positioned between a light source 254 and a light sensor 255.

Accordingly, the rollers 267 and 277 preferably have a high friction and slightly compressible outer coating and are mounted such that the rotation of scroll wheel axle 242 causes a rotation in the encoder wheel axle 252. If desired, a biasing arrangement, not shown, may be used for one or both of the axles 242 and 252, or on an intermediary roller axle if used, to ensure a desired level of force transfer capability between the rollers 267 and 277.

As with the embodiment illustration in FIG. 5, the roller 267 on the scroll wheel axle 242 preferably has a larger diameter that the roller 277 on the scroll wheel axle 252. This translates the rotational force in a manner such that the ratio of angular displacement of the encoder wheel 251 to the scroll wheel 241 is greater that 1:1. Further, in view of the flexibility in design the diameter of the encoder wheel 252 and the sensing region of the encoder wheel may be larger than the diameter of the scroll wheel 241 and that of conventionally used encoder wheels in computer input devices such as mice and trackballs.

Therefore, in use, rotation by the user of the portion of the scroll wheel 241 that extends through an opening the housing causes rotation of the encoder wheel 251 by a rate that exceeds that of the scroll wheel 241. Additionally, because of the increased diameter of the encoder wheel 251, more openings and light blocking material can be provided within the same practical cost and manufacturing limitations to provide more pulses per rotation of the encoder wheel 251. The benefits of such features, alone and in combination, have been previously described.

As with the embodiments of FIGS. 3 and 4, the scroll wheel arrangements 140 and 240 of FIGS. 5 and 6 preferably take advantage of either one or both of the gearing-up and increasing the diameter of the encoder wheel techniques to provide a high resolution scrolling system.

A Z-switch 46 or 46' may also be mounted adjacent to the axle 42 or 42' to sense downward pressure applied to the scroll wheel 41 or 41'. The axle 42 or 42' is configured to move a relatively small amount in a direction perpendicular to the axis of rotation, and the switch 46 or 46' closes in response to the perpendicular movement. Accordingly, the scroll wheel 41 or 41' also functions as a button. When the switch 46 or 46' is activated, a corresponding signal is transmitted to the host computer 10, thereby indicating that the individual is depressing the scroll wheel 41 or 41' generally toward the interior of the housing 31 or 31'.

If desired a detent mechanism may also be incorporated into the scrolling apparatus of any of the previously disclosed embodiments to prevent the scroll wheel from rotating unintentionally and to provide a segmented feel to the rotation of the scroll wheel.

While not shown, in lieu of the optical sensing system illustrated, the encoder wheel may have a side surface equipped with angularly spaced reflective elements. The light source and optical sensor can be placed on the same side of the encoder wheel. The light would then alternately be reflected off the reflective elements and absorbed in the regions therebetween. The reflected light is sensed by the light detector to create the sensed pulses. The pulses can be used to control the scrolling of an image as described above.

The specific configurations of the scrolling apparatus described and illustrated herein is intended to provide an example of the many configurations intended to fall within the scope of the present invention. Accordingly, the configuration of the scrolling apparatus may depart from the specific configuration disclosed above. For example, a sensor with a structure that is different from the optical encoders as disclosed may be utilized. Furthermore, the belt may be formed of a metallic or textile material, rather than the polymeric materials disclosed above.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. An input device for scrolling an image relative to a display screen, the input device comprising:
    a housing forming at least a portion of an exterior surface of the input device;
    a scroll wheel having a substantially circular configuration with an outer diameter, at least a portion of the scroll wheel extending outward from the housing and positioned to be manipulated by a user; and
    an encoder wheel coupled to the scroll wheel and configured to rotate in response to rotation of the scroll wheel, the encoder wheel having a diameter at a point at which rotation is optically sensed, the diameter of the encoder wheel being greater than the outer diameter of the scroll wheel, the scroll wheel and the encoder wheel being oriented perpendicular to each other.

2. The input device recited in claim 1, wherein a belt mechanically couples the scroll wheel and the encoder wheel, the belt being twisted around rotational axes of the scroll wheel and the encoder wheel that are angularly displaced from each other.

3. The input device recited in claim 1, further comprising a light source and a light sensor positioned on opposite sides of the encoder wheel.

4. The input device recited in claim 3, wherein the encoder wheel includes a plurality of spaced openings, and light from the light source passes through the openings and toward the light sensor when the encoder wheel rotates.

5. The input device recited in claim 4, wherein the openings are defined in peripheral portion of the encoder wheel.

6. The input device recited in claim 1, wherein the encoder wheel and the scroll wheel are coupled such that the ratio of angular displacement between rotation of the encoder wheel and rotation of the scroll wheel is greater than 1:1.

7. The input device recited in claim 1, further comprising a scroll wheel axle, an encoder wheel axle, each axle having a pulley mounted thereon, and a belt encircling the pulleys to mechanically couple the scroll wheel and the encoder wheel.

8. The input device recited in claim 7, wherein diameters of the pulleys are different such that a ratio of angular displacement between rotation of the encoder wheel and rotation of the scroll wheel is greater than 1:1.

9. The input device recited in claim 1, wherein the input device is one of a computer mouse and a trackball.

10. The input device recited in claim 9, wherein the scroll wheel is depressible to activate a switch located within the housing.

11. The input device recited in claim 1, further comprising:
    a housing having at least one aperture therein;
    the scroll wheel protruding outward through the aperture such that a first portion of the scroll wheel is inside the housing and a second portion is exposed for user manipulation;
    a light source; and
    a light sensor, wherein the encoder wheel is positioned between the light source and the light sensor.

12. The input device recited in claim 11, wherein a rotational axis of the scroll wheel and a rotational axis of the encoder wheel are offset, and wherein the encoder wheel and the scroll wheel are coupled such that a ratio of angular displacement between rotation of the encoder wheel and rotation of the scroll wheel is greater than 1:1.

13. An input device for scrolling an image relative to a display screen, the input device comprising:
    a scroll wheel; and
    an encoder wheel mechanically coupled to the scroll wheel such that a ratio of angular displacement between rotation of the encoder wheel and rotation of the scroll wheel is greater than 1:1, the scroll wheel and the encoder wheel being perpendicular to each other.

14. The input device recited in claim 13, wherein a first axle with a first pulley mounted thereon extends from the scroll wheel, a second axle with a second pulley mounted thereon extends from the encoder wheel, and a belt extends around the first pulley and the second pulley, a diameter of the first pulley being greater than a diameter of the second pulley.

15. The input device recited in claim 14, further comprising a light source and a light sensor positioned on opposite sides of the encoder wheel to detect rotation of the encoder wheel.

16. The input device recited in claim 15, wherein the encoder wheel includes a plurality of spaced openings, and light from the light source passes through the spaced openings and toward the light detector when the encoder wheel rotates.

17. The input device recited in claim 16, wherein the encoder wheel has a sensing diameter at a diameter of the spaced openings, and the scroll wheel includes an outer diameter, the sensing diameter of the encoder wheel being greater than the outer diameter of the scroll wheel.

18. The input device recited in claim 13, wherein the input device is one of a computer mouse, a trackball, and a keyboard.

19. The input device recited in claim 18, wherein the input device includes a housing having an aperture, wherein the scroll wheel is positioned to protrude through the aperture.

20. The input device recited in claim 19, wherein the scroll wheel is depressible to activate a switch located within the housing.

21. An input device for scrolling an image relative to a display screen, the input device comprising:
   a scroll wheel limited in rotation to a first rotational axis; and
   a sensor assembly mechanically coupled to the scroll wheel, the sensor assembly having a encoder wheel that rotates about a second rotational axis in response to rotation of the scroll wheel, the first rotational axis and the second rotational axis being perpendicular.

22. The input device recited in claim 21, wherein a ratio of angular displacement between rotation of the encoder wheel and rotation of the scroll wheel is greater than 1:1.

23. The input device recited in claim 21, wherein a belt mechanically couples the scroll wheel and the encoder wheel, the belt being twisted to extend around the first rotational axis and the second rotational axis.

24. The input device recited in claim 23, wherein a diameter of the encoder wheel is greater than a diameter of the scroll wheel.

25. The input device recited in claim 21, further comprising an axle with a pulley mounted thereon extending from the scroll wheel and an axle with a pulley mounted thereon extending from the encoder wheel, and a belt extending around the pulleys to mechanically couple the scroll wheel and the encoder wheel.

26. The input device recited in claim 25, wherein the input device is a computer mouse.

27. The input device recited in claim 26, wherein diameters of the pulleys are different.

* * * * *

UNITED STATES PATENT AND TRADEMARK OFFICE
CERTIFICATE OF CORRECTION

PATENT NO. : 7,091,951 B2
APPLICATION NO. : 10/359523
DATED : August 15, 2006
INVENTOR(S) : David D. Bohn It is certified that error appears in the above-identified patent and that said Letters Patent is hereby corrected as shown below:

In column 4, line 45, after "computer-related" delete "related".

In column 7, line 10, delete "41has" and insert -- 41 has --, therefor.

In column 8, line 11, delete "gearing- up" and insert -- gearing-up --, therefor.

In column 12, line 2, in Claim 5, delete "portion" and insert -- portions --, therefor.

Signed and Sealed this

Twenty-seventh Day of July, 2010

David J. Kappos
*Director of the United States Patent and Trademark Office*